April 9, 1935.  J. N. DEVEREUX  1,997,136
METHOD OF AND APPARATUS FOR MANUFACTURING FIBER BOARD
Filed Jan. 23, 1933  5 Sheets-Sheet 1
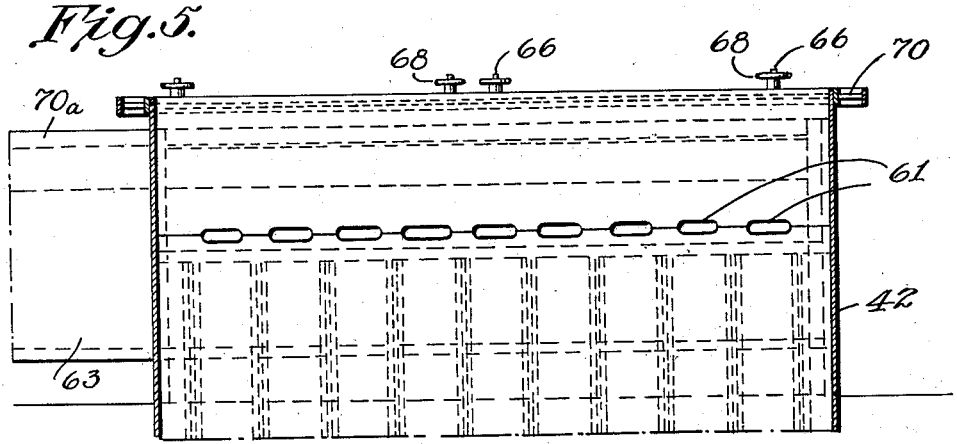
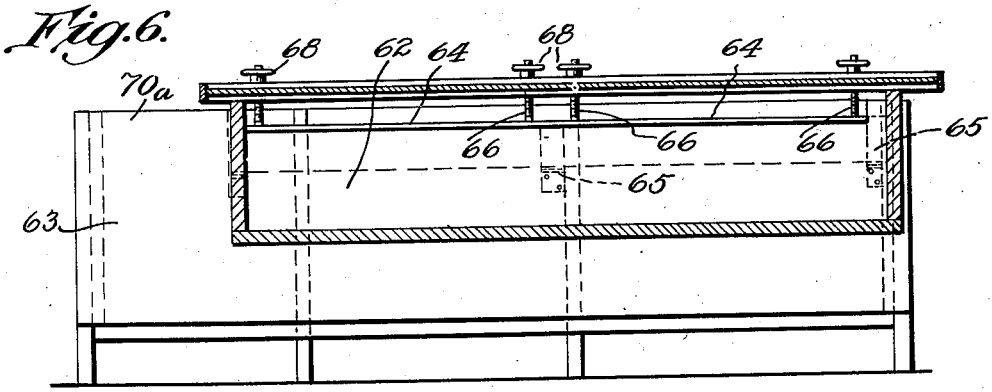
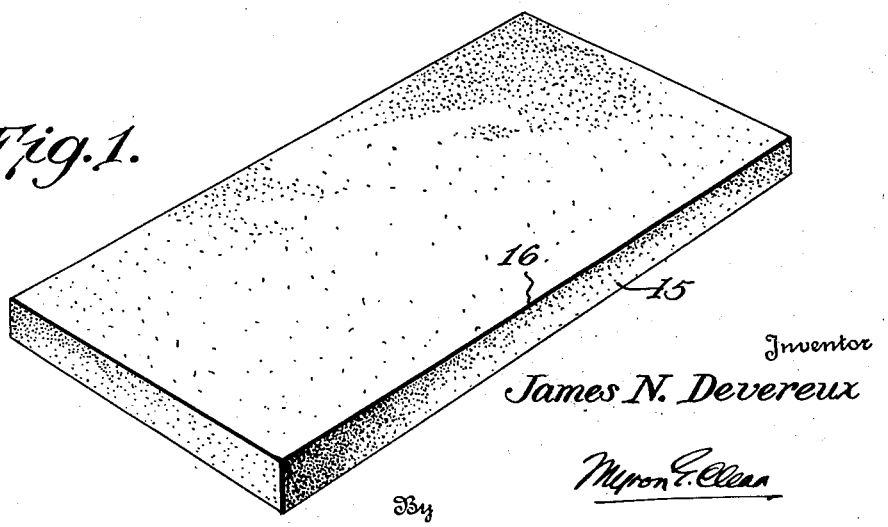
Inventor
James N. Devereux
By Myron G. Clear
Attorney April 9, 1935. J. N. DEVEREUX 1,997,136
METHOD OF AND APPARATUS FOR MANUFACTURING FIBER BOARD
Filed Jan. 23, 1933 5 Sheets-Sheet 2
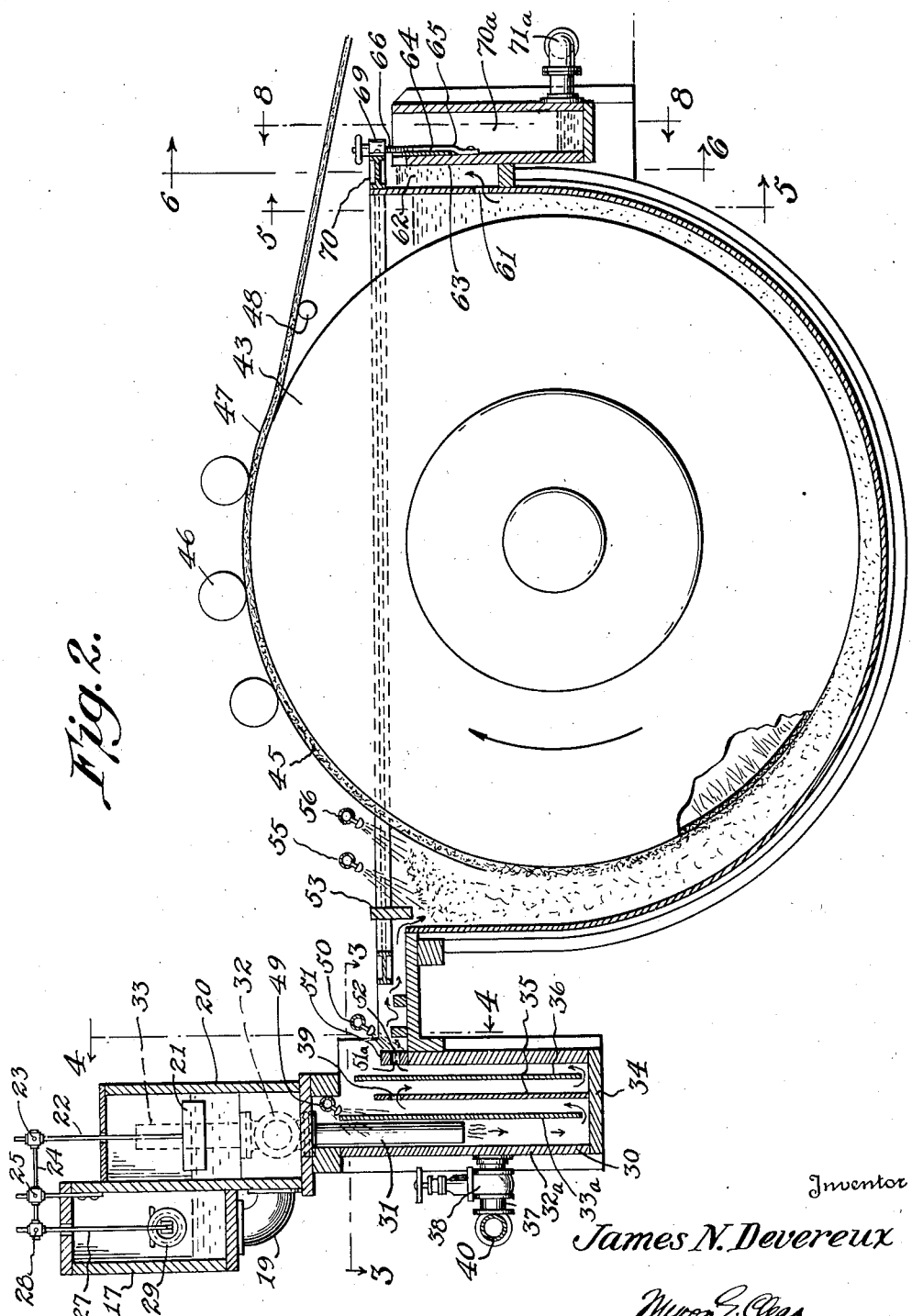

Inventor
James N. Devereux

April 9, 1935. J. N. DEVEREUX 1,997,136
METHOD OF AND APPARATUS FOR MANUFACTURING FIBER BOARD
Filed Jan. 23, 1933 5 Sheets-Sheet 4

Inventor
James N. Devereux
By
Attorney

April 9, 1935. J. N. DEVEREUX 1,997,136
METHOD OF AND APPARATUS FOR MANUFACTURING FIBER BOARD
Filed Jan. 23, 1933 5 Sheets-Sheet 5
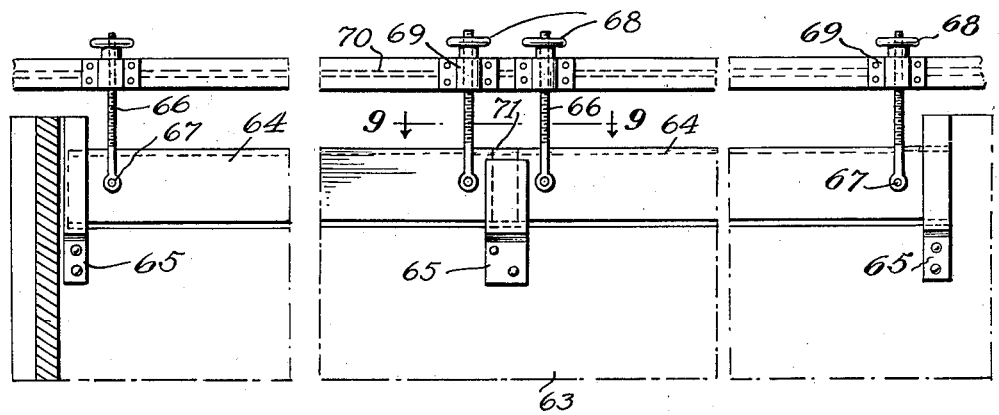
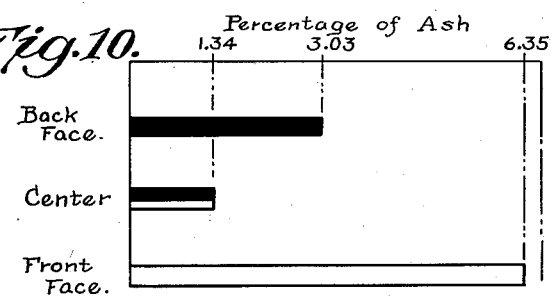
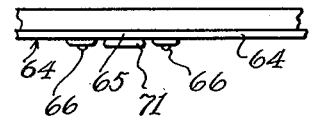
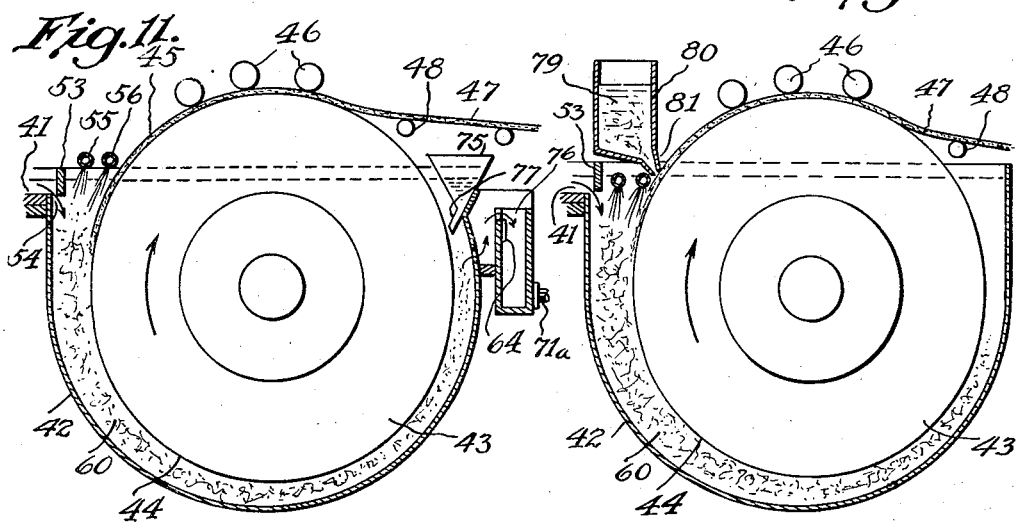
Inventor
James N. Devereux Patented Apr. 9, 1935

1,997,136

UNITED STATES PATENT OFFICE 1,997,136

METHOD OF AND APPARATUS FOR MANUFACTURING FIBER BOARD

James N. Devereux, Greenville, Miss.

Application January 23, 1933, Serial No. 653,166

11 Claims. (Cl. 92—41)

My present invention relates generally to the manufacture of fiber board or fiber sheets of the type commonly used in the construction of buildings, in walls, roofs, ceilings, partitions and the like, and embraces the method by which it is formed and the apparatus for the formation of the board and the carrying out of the method, the fiber board itself being claimed in a separate application, constituting a division of my present application.

In the manufacture of fiber board of the above type, it is customary to utilize wood, cornstalk or other vegetable fibers. These fibers are of a rough, coarse nature and due thereto and to a brushing operation to level off the newly formed sheet, the surface of the resulting board is rough and unsightly in appearance and is unsuitable for the direct application of paints, wall paper and other decorative materials commonly employed on building interiors.

Some effort has been made to use multiple cylinder machines of a suction type so that two or more webs of fiber are combined to form a single ply board. However the result has been to form layers in the finished board which are too readily torn apart and this is highly objectionable.

It is desirable to form a fiber board on a single cylinder machine so that separable plies in the finished product will be avoided, and it is also desirable that the finished board have a smooth, water resistant surface so that it may be washed when soiled, and so that plastic paints, wall paper and the like may be applied directly thereto with pleasing appearance.

The primary object of this invention is, therefore, to provide a method and apparatus by means of which a fiber board which is not readily separable into plies and presents a smooth, water resistant surface, may be formed in a practical, efficient manner.

A further object is to provide a method of making fiber board which will result in the deposit of a tough, close grained skin on the surface of the board so that the surface of the finished product will have a smooth, water resistant character readily adapted for the direct application of plastic paints and other similar decorative materials.

A still further object of my invention is to provide a novel method of, and apparatus for, manufacturing an improved fiber board, and also to improve fiber boards and the methods of, and apparatus for, manufacturing the same, in certain other respects to be hereinafter specifically pointed out and claimed.

In the accompanying drawings which illustrate my invention and form a part of this specification, Figure 1 is a detail perspective view of my improved fiber board.

Figure 2 is a vertical longitudinal sectional view through the apparatus proposed by my invention for the making of the board of Figure 1.

Figure 3:
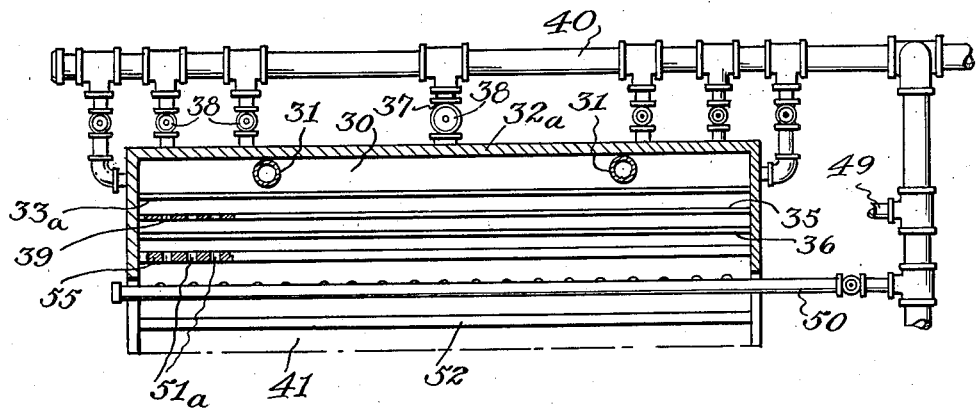
Figure 3 is a detail horizontal sectional view through the apparatus, taken on line 3—3 of Figure 2.
Figure 4:
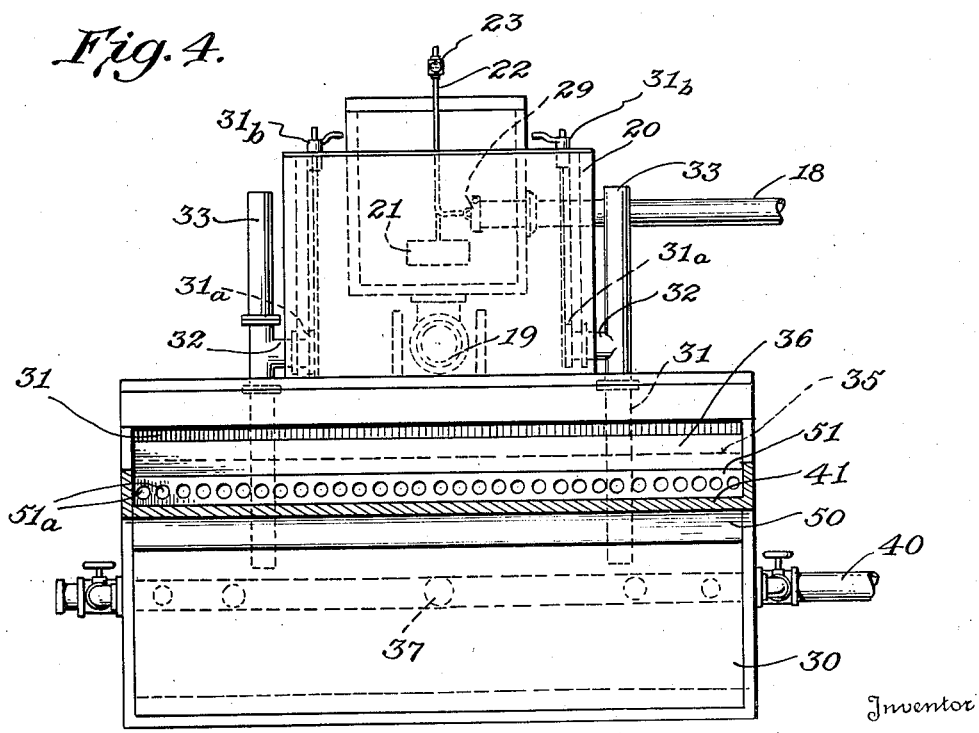

Figures 4, 5 and 6 are vertical transverse sectional views through the apparatus, taken respectively on lines 4—4, 5—5 and 6—6 of Figure 2.

Figure 7:
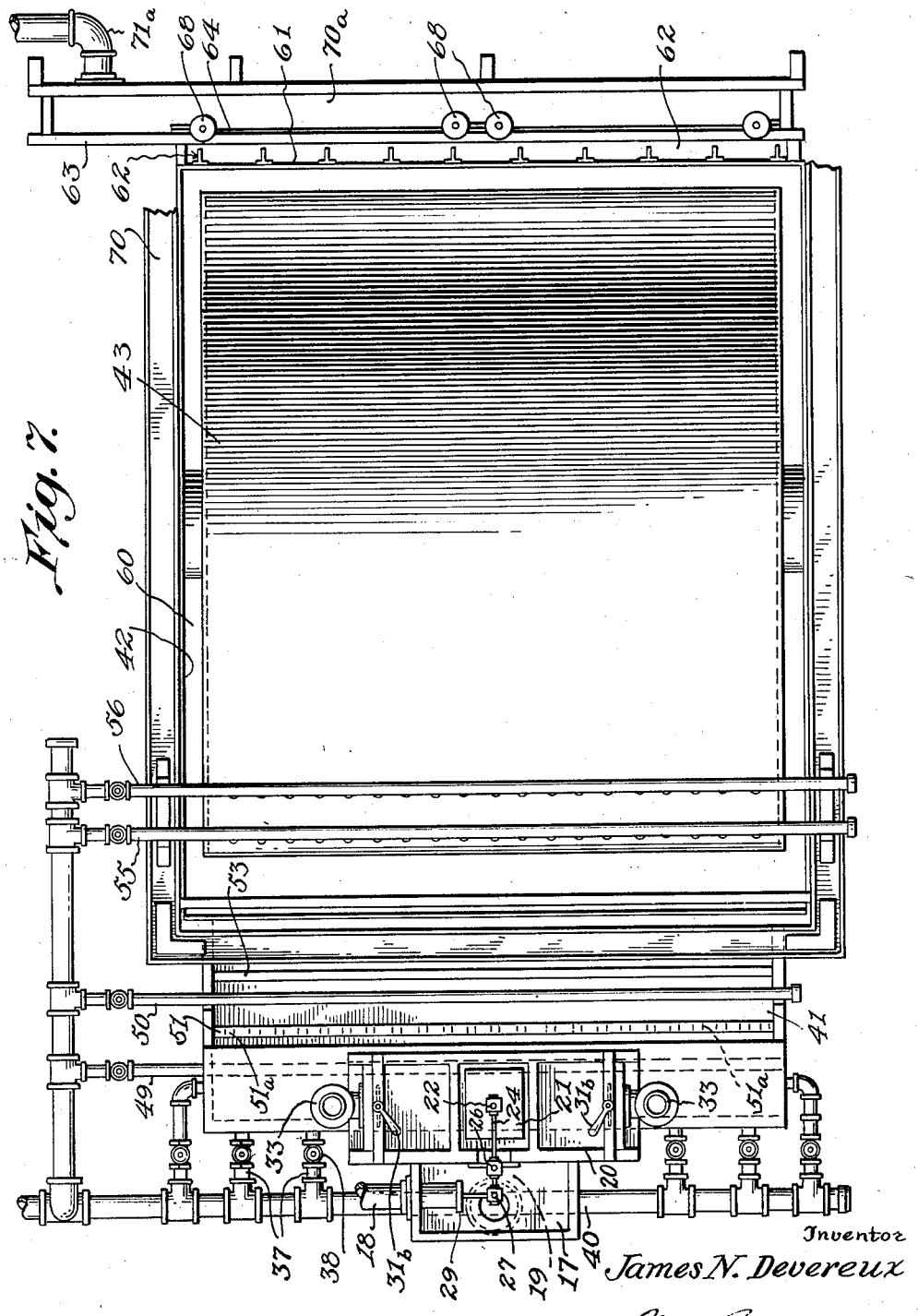

Figure 7 is a top plan view.

Figure 8 is a vertical transverse section taken on line 8—8 of Figure 2.

Figure 9 is a horizontal section taken on line 9—9 of Figure 8.

Figure 10 is a chart illustrating the ash content of the board as hereinafter described.

Figure 11 is a vertical longitudinal sectional view through a modified form of apparatus, and, Figure 12 is a similar view through another modified form of apparatus.

In the manufacture of my improved fiber board shown in Figure 1 and generally indicated at 15, I preferably agitate and aerate a watery mixture of fine and coarse wood fibers so as to produce a foam which floats the fine fibers to the surface of the mixture. This foam is subsequently killed in such manner as to deposit the fine fibers carried by the foam, upon the surface of the board as a thin skin 16, which is not only much smoother than the surface of the usual board, but is highly resistant to water so that it may be readily cleaned when necessary. The smooth skin 16 of the board is also well adapted for directly receiving plastic paints or other similar decorative materials such as wall paper.

The water proof character of the skin 16 is considerably enhanced by introducing sizing materials, such as alum and rosin, into the watery mixture containing the fibers so that the products of the reactions between the sizing materials and the hardness in the water, are floated to the surface along with the foam whereby the resultant skin on the board has a high ash content relative to the other portions of the body of the board.

In manufacturing the board several buhr stones are used for making fibers of different lengths and degrees of fineness, from logs or chips of wood. In a preferred graduated setting of the stones, it has been found that the fineness of the stock from the stones will vary from about 18 to 55 seconds and the composite stock will average around 31 seconds as measured on a standard nine and one half inch suction filter leaf having number twelve mesh. In use, cottonwoods is preferred, but other woods as willow, cypress, box elder, hackberry and the like, may be used.

The fiber, which is ground, is washed from the buhr mills and mixed so that approximately 20% of the fiber is either flour or ultra fine. The average length of the fibers in the mixture will be about one-fourth inch and the longest fibers will approximate one and one-fourth inches. This mixture of fine and coarse fibers is then screened to remove any pieces of wood or fibers longer than desired, and the screened stock is placed in a storage tank and subjected to agitation to keep the fibers in suspension.

The mixture of fibers is run into a box 17, forming a feed chamber, through a pipe 18, as best seen in Figures 2 and 4. The mixture flows from the box 17, through an elbow 19, into a float chamber 20, which has a float 21 on the surface of the stock mixture therein. A rod 22 leads upwardly from the float 21 and is pivotally connected, by a pin 23, to one end of a lever 24 which is fulcrumed by a pin 25, to a bracket 26 secured to the feed box 17. The other end of lever 24 is pivotally connected to a rod 27, by means of a pin 28, and the lower end of rod 27 is pivotally connected to a flap valve 29 which is hingedly connected to the inner end of the feed pipe 18. The float 21 therefore controls the opening and closing of the valve 29 so as to maintain a substantially uniform level of stock in the float chamber 20.

The float chamber 20 is mounted on top of a head box 30, and is connected therewith by two or more discharge pipes 31, through T's 32, and each of which has an air inlet pipe 33. Slide valves 31a are provided for the pipes 31, within the float chamber 20, these valves being controlled by valve handles 31b.

The pipes 31 discharge the concentrated and aerated stock from the float chamber 20 into the head box 30, between one wall 32a thereof and a vertically disposed baffle plate 33a, the bottom of which is spaced from the bottom 34 of the head box. A second baffle 35 and a third baffle 36 are also mounted in the head box and extend vertically in spaced relation to one another and to the baffle 33a. The bottom of the baffle 36 is spaced from the bottom of the head box, while the baffle 35 fits tightly against the said bottom so as to thus form a circuitous path for the flow and mixture of the stock, past the baffles 33a, 35 and 36 with diluting water supplied through pipes 37 and is controlled by valves 38 in these supply pipes. A lengthwise series of openings 39 is provided in the upper portion of the baffle 35 so as to bring about a substantially uniform flow of stock past the same. The several supply pipes 37 are connected to a water manifold 49, which leads from a suitable source of water supply.

A launder or chute 41 conveys the diluted and mixed stock from the head box 30, to a semicircular vat 42, partially enclosing a forming cylinder 43, which has a foraminous membrane 44 around its periphery and is operated under suction in a manner well known in the art so as to withdraw the water from the stock and deposit the fibers on the membrane 44 in the form of a web 45. This web passes under pressure rolls 46, which serve to compact the fibers and form a board-like sheet 47 which is conveyed away from the machine over an idle roller 48 to any suitable dryer (not shown) where the excess moisture is removed from the sheet so that it may be cut up into boards of the desired lengths.

The rapid flow of the aerated and diluted stock past the baffles 33a, 35 and 36, causes the formation of a considerable foam, and this foam may be reduced and controlled to any desired extent through the application of a water spray 49 adjacent to the baffles 33a, and a water spray 50 which impinges upon an outlet weir 51 mounted upon the edge of the head box 30. The weir 51 is preferably provided with a series of openings 51a which serve the same distribution purpose as the openings of the baffle 35. Cleats 52 extend transversely on the floor of the launder 41 and serve not only to increase the agitation of the stock and keep the fibers in suspension, but also to distribute the stock uniformly over the full width of the launder. A plate 53 is provided adjacent the discharge edge of the launder 41, and spaced therefrom to form substantially a feed slot 54 whereby the stock will be uniformly fed into the vat 42 over the full width thereof and thus produce a web 45 having a substantially uniform thickness throughout its width. This plate 53 is preferably adjustable so that the width of the feed slot 54 may be adjusted as desired.

Sizing materials, preferably consisting of a mixture of rosin and alum, are added to the storage tank for holding the concentrated stock. The rosin and alum react with one another and with the hardness in the water to produce complex bodies of an inorganic character which rise to the surface of the stock mixture in the vat 42 by reason of the flotation action of the foam produced by the agitation of the stock. The foam also carries to the surface a substantial quantity of ultra-fine fibers which, with the products of the above reaction, it is desired to precipitate upon the surface of the web. For this purpose one or more sprays 55 and 56 are provided above the surface of the stock and between the forming cylinder and the plate 53 so as to kill the foam by breaking the bubbles. The result of this is to deposit upon the surface of the web 45 that which appears in the finished web or board as a close grained skin. This skin surface is relatively smooth and gives to the board a light colored, attractive finish well adapted for the reception of plastic paint or other decorative materials. The skin surface just mentioned is also water resistant in such a degree that it may be readily washed or scrubbed, when soiled, without roughening or destroying the same.

The annular foraminous membrane 44 of the cylinder 43 is spaced from the wall of the vat 42 by a space 60 which continuously decreases in width toward the discharge end of the vat, so that the velocity of the stock is gradually increased to aid in keeping the coarse fibers in suspension and capable of more ready attraction to the membrane 44 by the suction within the cylinder 43. The surplus stock mixture overflowing after the web has been formed, discharges through openings 61 in the wall of the vat, into a weir chamber 62 provided with a wall 63. A pair of weir plates 64 are slidably mounted relative to the wall 63, by means of brackets 65, secured to the wall. Rods 66 are pivotally connected to the weir plates by means of pins 67 and the upper ends of these rods 66 are threaded to receive adjusting hand wheels 68 which are supported upon bearing brackets 69, secured to a transversely extending framework 70. The inner ends of the plates 64 are provided with bevels 71 which cooperate with one another so as to maintain a reasonably tight joint between the plates regardless of the height or angular position of one plate relative to the other. By making the two weir plates 64 independently adjustable, the velocity of the mixture passing between the cylinder and the vat wall can be maintained substantially constant over the complete width of the cylinder so as to insure a web of uniform thickness over its entire width.

The mixture passing over the weir plates 64, flows into a discharge box 70a, provided with an outlet pipe 71a, which may lead to any suitable point of final discharge. The discharged liquid is commonly re-used with fresh material, and must be distinguished from the white water passing through the membrane 44, which is discharged from the end of the cylinder, although even this water is re-used wherever possible instead of fresh water.

Among the advantages of the fiber board produced by the method and apparatus of my invention is that the skin surface before described, has approximately five times the ash content of the center of the board and approximately twice the ash content of the back surface of the board. The following table gives the analysis as to ash content of my improved sized and unsized boards, in percentages, as compared with boards A and B of other manufacture.

|  | My board | | Board "A" | Board "B" |
| --- | --- | --- | --- | --- |
|  | Sized | Unsized | | |
| Skin surface | 6.35 | 3.02 | 1.45 | 2.065 |
| Center | 1.34 | 0.834 | 0.474 | 2.34 |
| Back surface | 3.03 | 1.655 | 1.31 | 2.01 |

The above indicated ash content of the skin surface, center and back surface of my improved board is graphically illustrated in Figure 10, and it has been found that the high mineral content of the skin surface adds materially to its desirable water proof qualities.

As to the skin surface of my improved board, I have found that it has the following composition,

|  | Per cent |
| --- | --- |
| Wood fiber | 91.76 |
| Rosin | 3.34 |
| Inorganic matter | 4.90 |

Analysis of the ash of the skin surface shows that it contains the following,

|  | Per cent |
| --- | --- |
| $SiO_2$ | 4.78 |
| $R_2O_3$ (mostly $Al_2O_3$) | 34.80 |
| $CaO$ | 16.1 |
| $MgO$ | 5.37 |
| $Na_2O$ | 10.77 |
| $SO_3$ | 20.8 |
| Undetermined | 7.38 |

The above would indicate that the principal ingredients of the skin surface are fiber, free rosin and size reaction products, sodium sulphate, aluminum hydroxide, perhaps aluminum resinate and calcium sulphate, the calcium and magnesium being obtained from the hardness of the water.

In some cases it may be desirable to form a board having skin surface as above on the back thereof as well as the front. In such case, I propose to use the form of apparatus shown in Figure 11, in which a hopper 75 is provided adjacent a discharge box 76, said hopper being adapted to hold a mixture of ultra-fine fibers and water. The hopper 75 is provided with an elongated discharge spout 77 which extends across the width of the cylinder 43 and discharges a thin layer of fine fiber on the foraminous membrane of the cylinder just at the point where the formation of the web starts. The usual head box with baffles and sprays at the feed end of the vat are, of course, provided in the manner previously described with respect to Figures 1 to 9 inclusive.

In the form of apparatus shown in Figure 12, I provide for the application of a sizing liquid, ultra-fine fiber stock or other material 79 to the front face of the board immediately after the formative period. The material 79 is contained in a tank 80 which is provided with a lower elongated discharge spout 81 extending across the full width of the cylinder so as to deposit a uniform layer of sizing material, fine fibers or the like on the front face of the board web 45. Such an apparatus might be used where integral sizing is not desired, but only surface sizing is necessary.

From the foregoing it is obvious that in operation, the concentrated stock, containing fine and coarse fibers, sizing material and water, is first introduced into the feed box 17, and then flows into float chamber 20. From chamber 20, the stock mixture flows into the head box 30 and then in a circuitous path around the baffles 33a, 35 and 36 so as to be thoroughly mixed with diluting water introduced through pipes 37, and also with air drawn down through pipes 33, whereby to form the foam necessary for floating the fine fibers and mineral matter to the surface of the stock mixture. The mixture further flows down the launder 41, over the ripple cleats which serve to distribute the stock over the full width of the launder, and finally into the vat 42 between the adjacent edge of the launder and the distributing plate 53. The large amount of foam formed by the baffles in the head box, is reduced and controlled by means of the sprays 49 and 50, and is finally killed by the water sprays 55 and 56 which latter are arranged to impinge upon the foam just at the close of the formative period of the web 45 whereby to deposit the ultra-fine fibers and minerals carried by the foam, onto the web 45, as a skin surface.

The flow of stock mixture in the vat 42 is counter-current to the movement of the cylinder 43, through the constantly diminishing space 60 therebetween. As the web 45 is gradually formed on the foraminous membrane 44 of the cylinder the discharge from the vat is taken care of in the manner previously described, pressure rolls 46 serving to force the excess fluid from the web so as to reduce its thickness and finally form the board sheet 47.

While I have illustrated and described what constitutes the best mode so far devised for carrying my invention into effect, I do not wish to be understood as limiting myself thereto, but reserve all modifications and equivalents within the spirit of my invention as defined by the following claims.

Having thus fully described my invention, what I claim is,

1. The method of making fiber boards, which consists in forming a watery mixture of fibers of varying sizes, agitating the mixture to form a foam thereon and thereby float a substantial portion of finer fibers, felting the coarser fibers of the mixture into a sheet, and killing the foam on the mixture immediately adjacent to the surface of the sheet as it is formed to liberate the fine fibers, and thereafter depositing on its surface the liberated fine fibers of the foam in the form of a skin.

2. The method of making fiber boards, which consists in forming a watery mixture of fibers of varying sizes, and mineral matter, causing the mixture to form a foam on its surface and thereby collect a substantial portion of said mineral matter and fine fibers, felting the coarse fibers of the mixture into a sheet, killing the foam on the mixture immediately adjacent to the surface of the sheet as it is formed to liberate the fine fibers, and thereafter depositing, the liberated matter thereon in the form of a skin.

3. The method of making fiber boards which comprises forming a watery, foamaceous, aerated mixture of fine and coarse fibers, and sizing matter, causing a substantial portion of fine fibers and mineral reaction products to float to the surface of the mixture as a foam, killing the foam on the mixture immediately adjacent to the surface of the sheet as it is formed, to liberate the foam carried matter, felting a sheet from the coarse fibers of the mixture, depositing the liberated matter on the surface thereof, and pressing and drying the sheet.

4. The method of making fiber boards, which comprises forming an aerated mixture of coarse and fine fibers in water, causing a foam, carrying fine fibers, to rise to the surface of the mixture, felting the coarse fibers of the mixture into a board sheet, killing the foam on the mixture immediately adjacent to the sheet during the felting operation to liberate the fine fibers, depositing the liberated fine fibers as an integral surface skin on the sheet, and then drying the sheet.

5. The method of making fiber boards, which comprises forming a mixture of coarse and fine fibers in water, agitating and aerating said mixture to form a foam on the surface of the mixture and collect therewith a substantial portion of the fine fibers, felting the coarse fibers of the mixture into a board sheet, killing the foam on the surface of the mixture immediately adjacent to the surface of the sheet as it emerges from the mixture depositing a skin surface of liberated fine fibers on the sheet, and then drying said sheet.

6. The method of making fiber boards, which comprises forming a watery, foamaceous, aerated mixture of fibers of varying sizes, causing a substantial proportion of fine fibers to float to the surface of the mixture as a foam, felting the coarse fibers of the mixture into a sheet, killing the foam on the surface of the mixture immediately adjacent to the sheet as it emerges from the mixture to thus liberate the fine fibers, depositing the liberated fine fibers on the surface of the sheet, applying a sizing material to the deposited surface of the sheet, and then drying the sheet.

7. In an apparatus for making fiber boards, a continuously moving, foraminous membrane for forming a web under suction, means for supplying a watery mixture of coarse and fine fibers to said membrane, means for agitating and aerating said mixture to form a foam for floating fine fibers, and spray means for killing the foam at the surface of the mixture immediately adjacent to said membrane to deposit a skin of fine fibers on the surface of the web.

8. In an apparatus for making fiber boards, a moving, foraminous cylinder operating under suction, means for supplying a watery mixture of coarse and fine fibers to said cylinder to form a board web, means for forming a foam on said mixture floating a substantial proportion of fine fibers, and spray means for killing said foam immediately adjacent to said cylinder to deposit the fine fibers in the form of a skin on the surface of the web.

9. In an apparatus for making fiber boards, a moving, foraminous cylinder operating under suction, means for supplying a watery mixture of coarse and fine fibers to said cylinder to form a board web, means for forming a foam on said mixture floating a substantial proportion of fine fibers, and water sprays immediately adjacent to said cylinder for killing the said foam in position to deposit the fine fibers thereof on the surface of the web.

10. In an apparatus for making fiber board, a vat, means for feeding a watery fiber mixture into said vat, a web forming cylinder in the vat, a feed plate in the vat between the cylinder and said feed means, means for causing a foam on the surface of the mixture within the vat, and spray means for killing the foam in the vat immediately adjacent to the web forming surface of the cylinder and between the same and said feed plate.

11. In an apparatus for making fiber board, a vat, a cylinder within the vat for forming a web on the surface thereof under suction, means for feeding a watery fiber mixture to said vat, means associated with feeding means for uniformly distributing the mixture across the full width of the forming cylinder, means also associated with said feeding means for causing a foam on the surface of the mixture within the vat, spray means for killing the foam immediately adjacent to the surface of the cylinder, and a baffle member in the vat between the web-forming surface of the cylinder and the said feed means to prevent direct contact of the incoming mixture with the web being formed.

JAMES N. DEVEREUX.